(12) United States Patent
Park (10) Patent No.: US 8,240,865 B2
(45) Date of Patent: Aug. 14, 2012

(54) LIGHT UNIT AND DISPLAY APPARATUS HAVING THE SAME

(75) Inventor: Jun Seok Park, Gwangju (KR)

(73) Assignee: LG Innotek Co., Ltd., Seoul (KR)

( * ) Notice: Subject to any disclaimer, the term of this patent is extended or adjusted under 35 U.S.C. 154(b) by 130 days.

(21) Appl. No.: 12/443,567

(22) PCT Filed: Jan. 31, 2008

(86) PCT No.: PCT/KR2008/000593
§ 371 (c)(1),
(2), (4) Date: Mar. 30, 2009

(87) PCT Pub. No.: WO2008/096979
PCT Pub. Date: Aug. 14, 2008

(65) Prior Publication Data
US 2010/0110661 A1    May 6, 2010

(30) Foreign Application Priority Data
Feb. 5, 2007  (KR) .................. 10-2007-0011470

(51) Int. Cl.
*G09F 13/08* (2006.01)
(52) U.S. Cl. ............... 362/97.3; 362/97.1; 362/97.4
(58) Field of Classification Search ............ 362/28–30, 362/33, 97.1, 97.2, 97.3, 97.4, 230, 231, 362/236, 237, 240–246, 249.01, 249.02, 362/326, 327, 330, 540, 543–546, 561, 800, 362/812; 349/56–62, 64, 68–70; 40/541, 40/542, 549, 564–570
See application file for complete search history.

(56) References Cited

U.S. PATENT DOCUMENTS

| | | | | |
|---|---|---|---|---|
| 6,857,767 B2 * | 2/2005 | Matsui et al. | | 362/373 |
| 7,014,343 B2 | 3/2006 | Leu et al. | | |
| 7,178,942 B2 * | 2/2007 | Chen et al. | | 362/231 |
| 7,246,931 B2 * | 7/2007 | Hsieh et al. | | 362/612 |
| 7,254,309 B1 * | 8/2007 | Chou et al. | | 385/146 |
| 7,320,531 B2 * | 1/2008 | West et al. | | 362/231 |
| 7,341,358 B2 * | 3/2008 | Hsieh et al. | | 362/97.1 |
| 7,354,179 B2 * | 4/2008 | Huang et al. | | 362/337 |
| 7,414,270 B2 * | 8/2008 | Kim et al. | | 257/81 |
| 7,438,445 B2 * | 10/2008 | Shiau et al. | | 362/333 |
| 7,465,082 B2 * | 12/2008 | Sakamoto et al. | | 362/609 |
| 7,481,553 B2 * | 1/2009 | Kim et al. | | 362/240 |
| 7,524,098 B2 * | 4/2009 | Vennetier et al. | | 362/555 |
| 7,534,008 B2 * | 5/2009 | Kim et al. | | 362/231 |
| 7,540,635 B2 * | 6/2009 | Kim et al. | | 362/327 |
| 7,787,073 B2 * | 8/2010 | Bang | | 349/62 |
| 2006/0109685 A1 | 5/2006 | Noh et al. | | |
| 2006/0181866 A1 * | 8/2006 | Jung et al. | | 362/97 |

(Continued)

FOREIGN PATENT DOCUMENTS

| | | | |
|---|---|---|---|
| CN | 1779530 A | | 5/2006 |
| JP | 2004311353 A | * | 11/2004 |
| JP | 2005-197072 A | | 7/2005 |

(Continued)

*Primary Examiner* — Hargobind S Sawhney
(74) *Attorney, Agent, or Firm* — Birch, Stewart, Kolasch & Birch, LLP (57) ABSTRACT

Disclosed are a light unit and a display apparatus having the same. The light unit comprises a bottom cover; a light source module comprising light emitting diodes on and/or inserted under the bottom cover; a dispersion member that disperses light which is generated from the light emitting diode, on the light source module; and an optical plate on the dispersion member.

17 Claims, 4 Drawing Sheets

U.S. PATENT DOCUMENTS

| | | | |
|---|---|---|---|
| 2006/0221612 A1* | 10/2006 | Song et al. | 362/247 |
| 2006/0238884 A1* | 10/2006 | Jang et al. | 359/653 |
| 2006/0285311 A1* | 12/2006 | Chang et al. | 362/97 |
| 2006/0285326 A1 | 12/2006 | Jeon | |
| 2007/0063338 A1* | 3/2007 | Chang et al. | 257/714 |
| 2007/0070625 A1* | 3/2007 | Bang | 362/240 |
| 2008/0101069 A1* | 5/2008 | Chang | 362/247 |

FOREIGN PATENT DOCUMENTS

| | | |
|---|---|---|
| JP | 2006-49324 A | 2/2006 |
| JP | 2007-26702 A | 2/2007 |
| KR | 10-2006-0131314 A | 2/2006 |
| KR | 10-2006-0057837 A | 5/2006 |
| WO | WO 2006137686 A1 * | 12/2006 |

* cited by examiner

LIGHT UNIT AND DISPLAY APPARATUS HAVING THE SAME

TECHNICAL FIELD

The embodiment relates to a light unit and a display apparatus having the same.

BACKGROUND ART

Typical displays include a cathode ray tube (CRT), a liquid crystal display (LCD) using electro-optic efficiency, a plasma display panel (PDP) using gas discharge, and an electro luminescence display (ELD) using electroluminescence. Among them, the research on the LCD has been actively performed.

Recently, the LCDs have been developed enough to serve as a flat display, so that the LCDs have been used for the monitor of a desktop computer, a TV, and a large-scaled information display, as well as the monitor of a laptop computer.

Since most of the LCDs are light receiving devices that adjust an amount of light received from an external device to display an image, an additional light source, that is, a back light unit to irradiate light to an LCD panel is required.

DISCLOSURE OF INVENTION

Technical Problem

The embodiment provides a light unit and a display apparatus having the same, capable of covering an entire display area by using a light source module provided at the central portion.

The embodiment provides a light unit and a display apparatus having the same, capable of employing a scheme of dispersing the light of a light source module, which is provided at the central portion, throughout an entire display area, thereby improving brightness uniformity and color uniformity.

Technical Solution

The embodiment provides a light unit comprising: a bottom cover; a light source module comprising light emitting diodes on and/or inserted under the bottom cover; a dispersion member that disperses light which is generated from the light emitting diode, on the light source module; and an optical plate on the dispersion member.

The embodiment provides a light unit comprising: a bottom cover; a light source module comprising a light emitting diode array on a top surface of the bottom cover and/or inserted under the bottom cover; a dispersion member on the light source module to disperse light of the light emitting diode; a reflector member disposed on the top surface of the bottom cover; and an optical plate on the bottom cover.

The embodiment provides a display apparatus comprising: a bottom cover; a light source module comprising a light emitting diode array on a top surface of the bottom cover and/or inserted under the bottom cover; a dispersion member on the light source module to disperse light of the light emitting diode; a reflector member on the top surface of the bottom cover; an optical plate on the bottom cover; and a display panel on the optical plate.

Advantageous Effects

In a light unit and a display apparatus having the same according to the embodiment, surface light can be provided throughout the entire display area by using the light source module and the dispersion member provided in the central portion of the light unit.

According to the embodiment, the color uniformity and the brightness uniformity of surface light can be improved.

According to the embodiment, a slim light unit can be realized.

According to the embodiment, light emitting diodes are densely provided in the light source module, so that an optical influence is not exerted on the display even if a small number of light emitting diodes are defected.

According to the embodiment, the light source module is easy to be replaced.

According to the embodiment, the light unit can be utilized as a light source for illumination, interior design, or indication.

BEST MODE FOR CARRYING OUT THE INVENTION

Hereinafter, a light unit and a display apparatus according to the embodiment will be described with reference to accompanying drawings.

Figure 1:
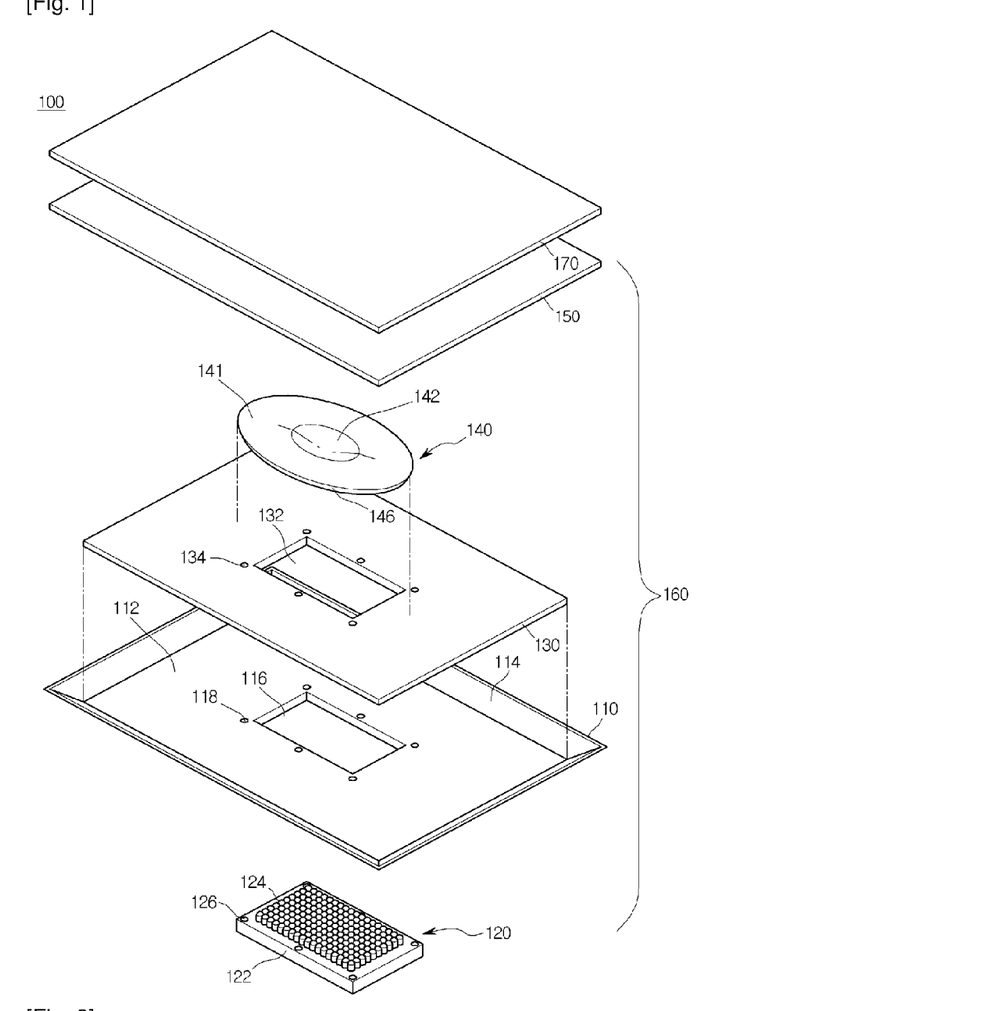
FIG. 1 is an exploded perspective view showing a display apparatus according to the embodiment.
Figure 2:
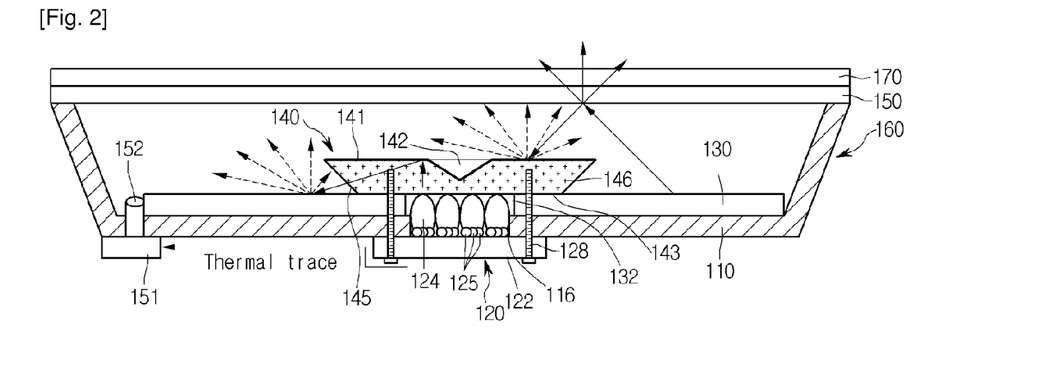
FIG. 2 is a side sectional view showing the assembling state of the display apparatus according to the embodiment.

FIG. 1 is a perspective view showing a display apparatus according to the embodiment, and FIG. 2 is a side sectional view showing the assembling state of the components of FIG. 1.

Referring to FIGS. 1 and 2, a display apparatus 100 comprises a light unit 160 and a display panel 170.

The light unit 160 comprises a bottom cover 110, a light source module 120, a reflector member 130, a dispersion member 140, and an optical plate 150. The light unit 160 disperses dense point light to emit surface light.

The bottom cover 110 is a support member to prevent internal light from being leaked to an exterior. For example, the bottom cover 110 comprises materials, such as aluminum (Al), magnesium (Mg), zinc (Zn), titanium (Ti), tantalum (Ta), hafnium (Hf), and niobium (Nb), and serves as a chassis.

The bottom cover 110 is provided therein with the light source module 120. The bottom cover 110 has a central portion formed with a diode insertion hole 116. The diode insertion hole 116 may have a predetermined shape, such as a circular shape or a polygonal shape, allowing a portion of the light source module 120 to protrude, and the shape may be changed within the scope of the present embodiment. Screw holes 118 are formed around the diode insertion hole 116.

The bottom cover 110 is formed at an outer peripheral portion thereof with a side surface 114, and the side surface 114 is slanted outward at a predetermined angle (e.g., 90 to 160°). The side surface 114 may be coated with reflective materials (e.g., Ag, Al, etc.) to reflect light.

Figure 3:
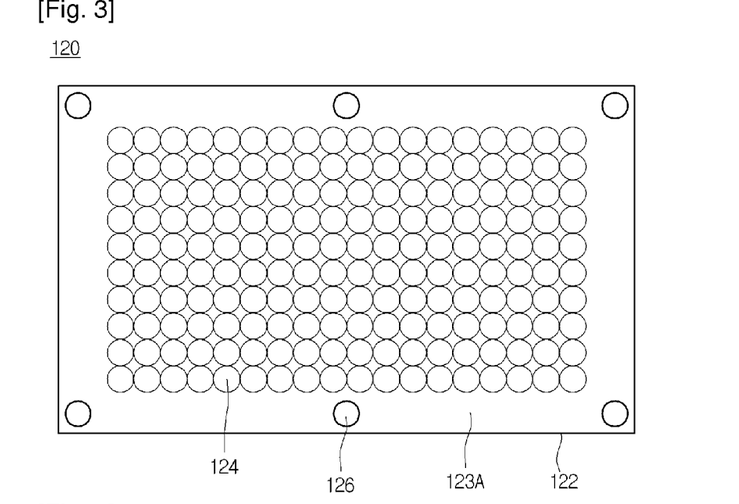
FIG. 3 is a plan view showing a light source module according to the embodiment.
Figure 4:
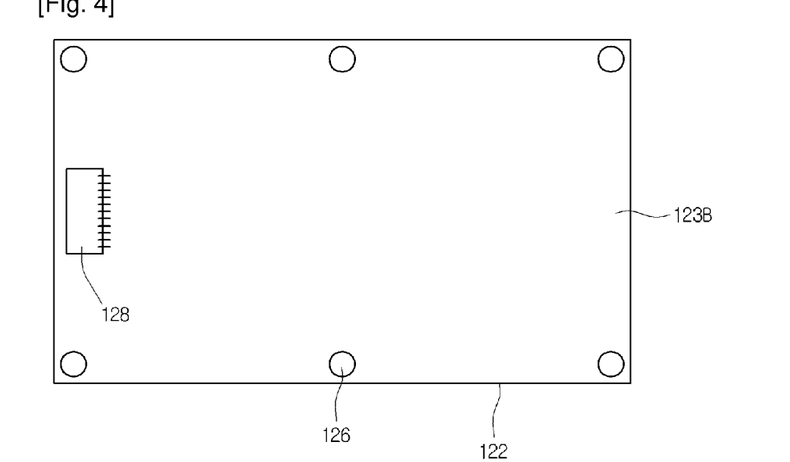
FIG. 4 is a rear view of FIG. 3.

FIGS. 3 and 4 are a plan view and a rear view showing the light source module 120.

As shown in FIGS. 1 to 4, the light source module 120 comprises a board 122 and a plurality of light emitting diodes 124, and the light emitting diodes 124 are densely mounted on one surface of the board 122 (see reference number 123A of FIG. 3).

The board 122 comprises a metal core PCB or an FR-4 PCB. The type of the board 122 may be changed within the scope of the embodiment, and the embodiment is not limited thereto. The board 122 is formed at an outer portion thereof with screw holes 126 corresponding to the screw holes 118 of the bottom cover 110.

The light emitting diodes 124 may be mounted on the board 122 through the Chip On Board (COB) scheme or the discrete scheme. The light emitting diodes 124 comprising the form of an N×M matrix (N and M are natural numbers greater than or equal to 2) may be arranged on the board 122 in the shape of a rectangle, a circle, or a polygon, and various diode arrangement shapes may be employed.

The light emitting diodes 124 may be realized as white light emitting diodes by packaging a red light emitting diode chip, a green light emitting diode chip, and a blue light emitting diode chip. In addition, the light emitting diodes 124 comprise one of a red light emitting diode, a green light emitting diode, and a blue light emitting diode, or the combination thereof. Each light emitting diode 124 may be realized as a white light emitting diode by packaging a light emitting diode chip and a phosphor. The light emitting diodes 124 may be clustered, and may be realized by selectively using at least one of light emitting diode chip generating a visible light, an UV light emitting diode chip, and a phosphor within the scope of the embodiment.

The number of the light emitting diodes 124 and the interval between the light emitting diodes 124 may be changed according to the luminous flux and the orientation angle of each light emitting diode and the depth of the bottom cover 110. For example, the depth of the bottom cover 110 may be decreased if the orientation angle of the light emitting diode 124 is increased or the pitch interval between the light emitting diodes is decreased. In addition, the number of the light emitting diodes 124 may be decreased if the optical power intensity of each light emitting diode is strong.

The reflector member 130 reflects light toward the display panel 170. The reflector member 130 comprises a white reflective film or a silver reflective film, or may be provided by coating a sheet surface with a reflective material (e.g., Ag, Al, etc.). Such a reflector member 130 may employ a material or a film capable of increasing a reflective index within the scope of the embodiment. In addition, a reflective material may be coated on the inner surface of the bottom cover 110 without providing the reflector member 130.

The reflector member 130 is formed with a diode insertion hole 132 corresponding to a diode insertion hole 116 of the bottom cover 110, and screw holes 134 are formed around the diode insertion hole 132. The reflector member 130 is disposed on the top surface of the bottom cover 110.

The reflector member 130 may be slanted in order to increase a reflective index. Also, the size of the diode insertion hole 132 may be greater than or equal to the size of the diode insertion hole 116 of the bottom cover 110.

As shown in FIG. 4, a connector 128 is provided at the one side of the rear surface 123B of the board 122, and may be connected to a driver board (reference number 151 of FIG. 2). The connector 128 provided at the rear surface of the light source module 120 may be positioned at another place, and the embodiment is not limited thereto.

Figure 5:
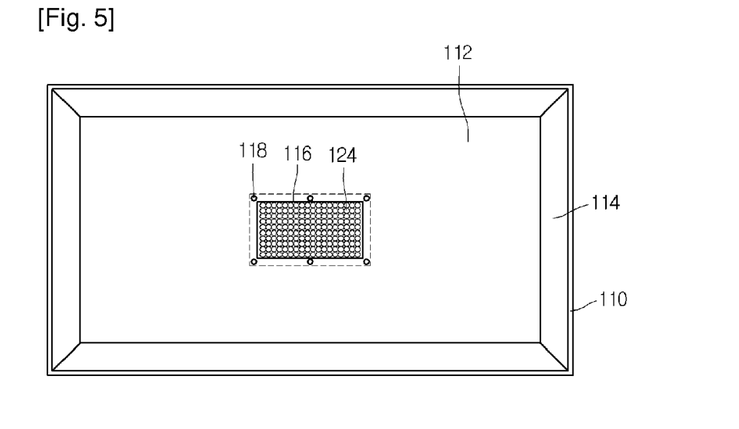
FIG. 5 is a plan view showing a bottom cover coupled to a light source module according to the embodiment.
Figure 6:
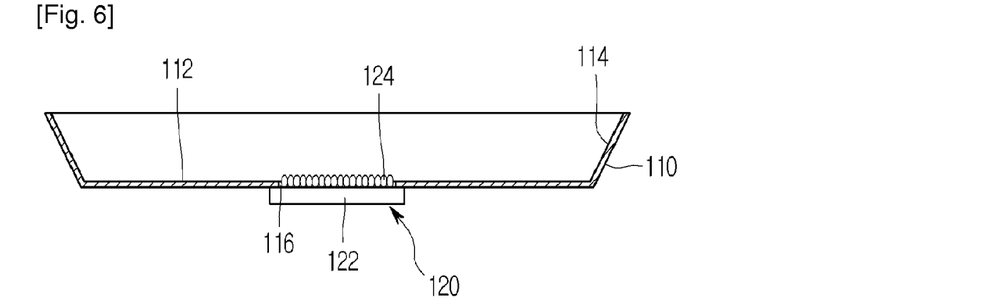
FIG. 6 is a side sectional view of FIG. 5.

FIGS. 5 and 6 are a plan view and a side sectional view showing the bottom cover coupled to the light source module.

Referring to FIGS. 5 and 6, the light source module 120 is provided at the central portion of the bottom cover 110. The light source module 120 may have the size corresponding to $\frac{1}{5}$ to $\frac{1}{15}$ times the size of the bottom cover 110. The top surface of the board 122 of the light source module 120 disposes on the rear surface of the bottom cover 110.

Figure 7:
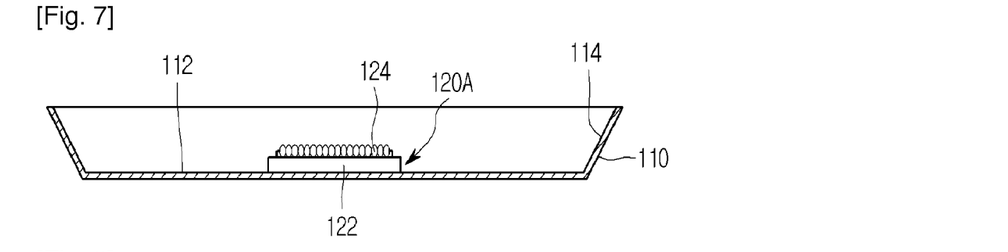
FIG. 7 is a side sectional view showing a light source module provided in a bottom cover according to the embodiment.
Figure 8:
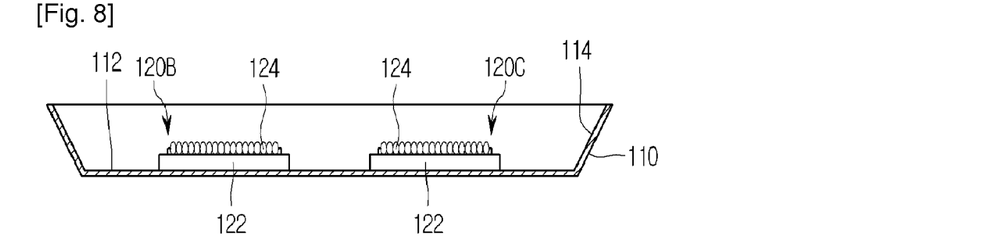
FIG. 8 is a side sectional view showing a plurality of light source modules provided in a bottom cover according to the embodiment.
Figure 9:
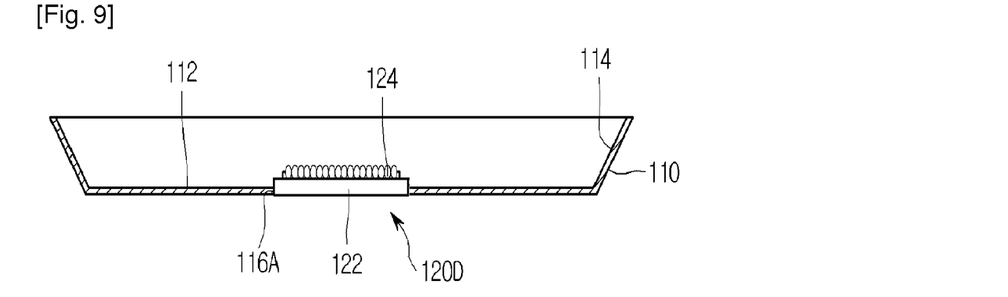
FIG. 9 is a side sectional view showing a light source module provided in a bottom cover according to the embodiment.

FIGS. 7 to 9 are sectional views showing the bottom cover 110 coupled to the light source module according to another embodiment.

Referring to FIG. 7, a light source module 120A may be attached to the bottom surface of the bottom cover 110. A board 122 of the light source module 120A is attached to the bottom cover 110, and an additional diode insertion hole is not formed in the bottom cover 110.

Referring to FIG. 8, a plurality of light source modules 120B and 120C are provided at both sides of the center portion of the bottom cover 110. Such light source modules 120B and 120C may be provided above or below the bottom cover 110.

Referring to FIG. 9, a light source module 120D may be coupled to the bottom cover 110 through a module insertion hole 116A of the bottom cover 110. Accordingly, it is possible to prevent the light source module 120D from protruding out of the rear surface of the bottom cover 110. The light source module 120D may be fixed to the bottom cover 110 through bonding, adhesion, or coupling.

Accordingly, at least one light source module may be provided inside the bottom cover 110, and the installation position of the light source module may be changed in the bottom cover 110.

Figure 10:
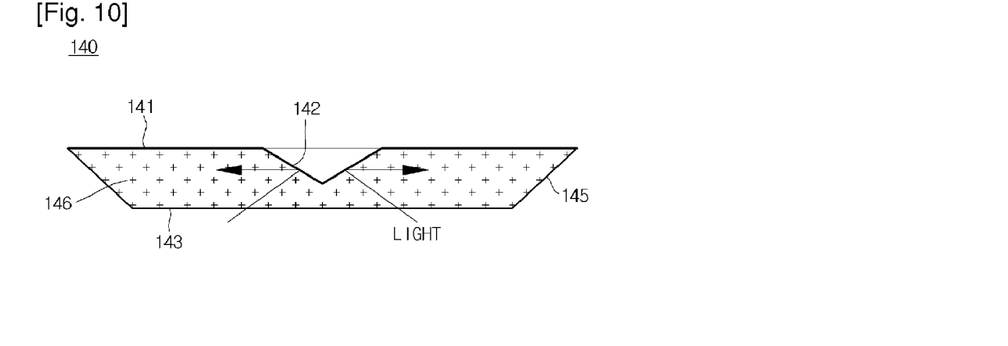
FIG. 10 is a side sectional view showing a dispersion member according to the embodiment.

FIG. 10 is a side sectional view showing the dispersion member.

As shown in FIGS. 1, 2, and 10, the dispersion member 140 comprises a reflective sheet 141 and an optical panel 146, and is provided over the light source module 120, so that light incident from the light emitting diode 124 can be dispersed throughout the display apparatus 100. The reflective sheet 141 is a double-sided reflective sheet, and is bonded to the top surface of the optical panel 146 to reflect light incident from the position above/below the reflective sheet 141.

The optical panel 146 is provided above the light emitting diodes 124 to transmit light. Such an optical panel 146 comprises a light permeable material, that is, one selected from the group consisting of polymethylmethacrylate (PMMA), poly methyl methacrylate styrene, poly carbonate, cycloolefine, and poly ethylene terephthalate.

The optical panel 146 may have a bottom surface in the shape of a circle, an oval, and a polygon, or a top surface in the shape of a circle, an oval, or a polygon. The optical panel 146 may have the top surface greater than the bottom surface 143. In addition, the optical panel 146 may have the shape of a reciprocal cone, or a reciprocal pyramid. In this case, an additional support structure may be provided to support the optical panel 146.

A concave lens or a V-shaped reflective groove 142 is formed at the center portion of the top surface of the optical panel 146. The reflective groove 142 is symmetric with respect to the center portion, and the center portion of the reflective groove 142 is positioned at the center portion of the light emitting diodes. The reflective sheet of the reflective groove 142 radiates light, which is incident from the light emitting diode 124, toward the side surface 145. The shape of the reflective groove 142 may be changed within the scope of the embodiment.

The optical panel 146 may be formed at the lower portion thereof with screw holes (not shown) corresponding to the screw holes 134 of the reflective member 130.

Figure 11:
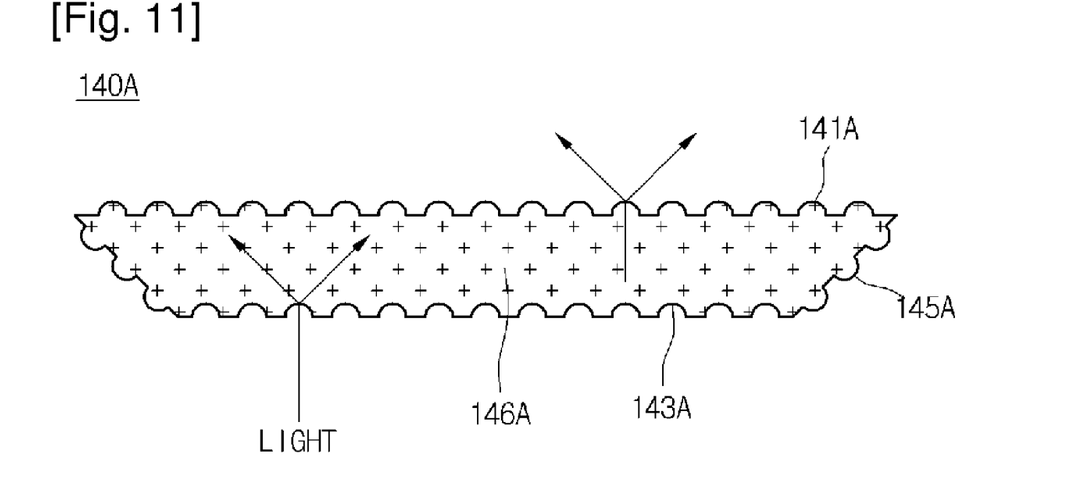
FIG. 11 is a view showing a dispersion member according to another embodiment.

FIG. 11 is a view showing a dispersion member according to another embodiment.

Referring to FIG. 11, a dispersion member 140A comprises a body 146A including a permeable material, and may have the surface formed with concave and/or convex lenses 141A, 143A, and 145A, or embossing. For example, the dispersion member 140A may be formed at a bottom surface thereof with concave lenses 143A arranged at a predetermined interval. In addition, the dispersion member 140A may be formed at a side surface and a top surface thereof with convex lenses 145A and 141A which are arranged at a predetermined interval. Such convex lenses 141A, 143A, and 145A can scatter incident light to disperse the light throughout the entire area of the display apparatus 100.

As shown in FIGS. 1 and 2, although the structure, in which the screw holes 126, 118, and 134 are formed on the board 122 of the light source module 120, the bottom cover 110, the reflector member 130, and the optical panel 146, is described, a bonding unit, such as adhesion and/or glue, tackifier, may be used instead of the screw coupling structure. The fixture units may be employed together. In addition, the components may be individually fixed. For example, the light source module 120 may be fixed to the bottom cover 110 by using a screw, and the reflector member 130 may be fixed to the optical panel 146 through another attachment scheme.

The optical plate 150 is provided on the bottom cover 110. The optical plate 150 diffuses surface light, which is generated from the inside of the bottom cover 110, to irradiate the light toward the display panel 170. The optical plate 150 one or more at least one of a diffusion sheet, a horizontal prism sheet, a vertical prism sheet, and a high brightness enhancement film.

The display panel 170 displays information by using light irradiated from the rear portion. Such the display panel 170 comprises the first and second substrates (not shown), which face each other and comprise transparent material, and a liquid crystal layer (not shown) interposed between the first and second substrates (not shown). Although the liquid crystal in a twist nematic (TN) mode is described, a liquid crystal panel employing an ECB mode, an OCB mode, an IPS mode, or a VA mode may be realized. In addition, the liquid crystal panel may operate in a normally white mode or a normally black mode. The characteristic or the type of the substrate and the liquid crystal layer may be changed within the scope of the embodiment, and the embodiment is not limited thereto. A polarizer (not shown) may be attached onto the upper portion and/or the lower portion of the display panel 170. The polarizer (not shown) transmits light polarized in one direction, and polarization directions of liquid crystal are orthogonal to each other when the liquid crystal is in a 90 degree-TN mode.

Hereinafter, the coupling sequence and the operation of components of the display will be described.

Referring to FIGS. 1 and 2, the reflector member 130 is provided on the bottom cover 110, and the screw holes 118 and 134 of the bottom cover 110 and the reflector member 130 are arranged such that the screw hole 118 of the bottom cover 110 corresponds to the screw hole 134 of the reflector member 130.

The dispersion member 140 is provided on the reflector member 130, the light source module 120 is provided in the bottom cover 110, and then a screw is coupled to a screw hole (not shown) of the dispersion member 140 through the screw holes 126, 118, and 134 of the light source module 120, the bottom cover 110, and the reflector member 130, thereby integrally fixing the light source module 120, the reflector member 130, and the dispersion member 140 to the bottom cover 110. The light source module 120 is easy to be replaced, and an optical influence is not exerted if a small number of light emitting diodes 124 is defected.

The optical plate 150 is provided on the bottom cover 110, and then the display panel 170 is provided on the optical plate 150, thereby assembling the display apparatus 100. Further, guide pins may be installed on the bottom cover 110 to prevent the optical plate 150 from sagging.

Regarding the operation of the display apparatus 100, the light generated from the light emitting diode 121 of the light source module 120 is emitted to the central portion of the bottom cover 110 in the shape of dense point light. The emitted light passes through the optical panel 146 of the dispersion member 140, and then is reflected from the reflective sheet 141 and the reflective groove 142, so that the light passes through the side surface 145 of the optical panel 146.

The light having passed through the side surface 145 of the optical panel 146 is reflected by the reflector member 130 on the bottom cover 110 and then progressed to the optical plate 150. A portion of light having been incident on the optical plate 150 is reflected and then input to the reflective sheet 141 attached onto the surface of the dispersion member 141. At this time, the reflective sheet 141 reflects the incident light to the optical plate 150. The optical plate 150 diffuses or scatters the incident light so that the light is uniformly applied throughout the entire area of the display panel 170. Accordingly, light from the central portion of the light source module 120 is dispersed and diffused in the shape of surface light, so that brightness and color uniformity can be improved.

As shown in FIG. 2, at least one color sensor 152 is provided inside the bottom cover 110. The color sensor 152 detects light generated from the inside of the bottom cover 110, and the detected optical signal is delivered to a driver board 151 provided at the lower portion of the bottom cover 110. The driver board 151 determines the intensity or the color mixing degree of the light of the light emitting diode 124 by using the optical signal detected by the color sensor 152 to control the current of the light emitting diode 124. For example, the driver board 151 receives optical information about a red light emitting diode chip, a blue light emitting diode chip, and a green light emitting diode chip, so that the intensity and the color mixing degree of the light of each light emitting diode chip can be adjusted.

In addition, a heat dissipation unit may be attached to the rear surface of the bottom cover 110 and/or the rear surface of the board 122 of the light source module. The heat dissipation unit comprises a flexible graphite sheet, a heatsink, a radiant fin, or a peltier element.

The light unit 160 according to the embodiment employs a direct lightening scheme in which the light emitting diode is employed as a light source to irradiate light to the display panel, thereby improving the brightness uniformity and the color mixing degree of the light.

In addition, LED light sources are densely provided on the central portion of the bottom cover 110, so that a uniform light source can be provided from the central portion of the bottom cover 110 to the entire light emitting area. In addition, the light source module 120 is provided inside and/or under the bottom cover 110, so that the assembly or the disassembly of a backlight unit is easy, and a slim backlight unit may be realized.

The light emitting diodes 124 are densely provided in the light source module 120, so that an optical influence is not exerted on the display even if a small number of the light emitting diodes 124 are failed.

As the optical power and the optical efficiency of the light emitting diode 124 are improved, the number of used light emitting diodes may be reduced, and the size of the bottom cover 110 may be minimized.

The light unit 160 employing the light source module 120 can be employed for a surface light source for illumination and interior illumination as well as the light source of the display panel 170.

Although preferred embodiments has been disclosed in the specification and the drawings, it is intended to not limit the scope of the embodiments, but easily explain the technical teachings of the embodiments and assist the understanding thereof. It will be obvious to those skilled in the art that variations and modifications of the disclosed embodiments can be made without departing from the spirit and scope of the embodiments based on the technical spirit of the embodiments as set forth in the following claims.

INDUSTRIAL APPLICABILITY

In a light unit and a display apparatus having the same according to the embodiment, surface light can be provided throughout the entire display area by using the light source module and the dispersion member provided in the central portion of the light unit.

According to the embodiment, the color uniformity and the brightness uniformity of surface light can be improved.

According to the embodiment, a slim light unit can be realized.

According to the embodiment, light emitting diodes are densely provided in the light source module, so that an optical influence is not exerted on the display even if a smaller number of light emitting diodes is defected.

According to the embodiment, the light source module is easily replaced.

According to the embodiment, the light unit can be utilized as a light source for illumination, interior design, or indication.

The invention claimed is:

1. A light unit comprising:
    a bottom cover including a first insertion hole which is formed at a center portion thereof;
    a light source module comprising a substrate and a plurality of light emitting diodes on the substrate, wherein the plurality of light emitting diodes are inserted into the first insertion hole of the bottom cover;
    a reflector member which includes a second insertion hole corresponding to the first insertion hole of the bottom cover and disposed on a top surface of the bottom cover;
    a dispersion member disposed on the light emitting diodes and a central portion of the reflector member, and dispersing light generated from the light emitting diodes of the light source module, the dispersion member comprising an optical panel comprising a light-transmitting material on the light emitting diodes; and
    a reflective sheet formed at a top surface of the optical panel, wherein the reflective sheet includes a double-sided reflective sheet.

2. The light unit as claimed in claim 1, wherein the light emitting diodes are inserted into the first insertion hole of the bottom cover and the second insertion hole of the reflector member.

3. The light unit as claimed in claim 1, wherein a width of the dispersion member is smaller than a width of the reflector member.

4. The light unit as claimed in claim 1, wherein the top surface of the optical panel includes a reflective groove slantingly formed at the central portion of the optical panel, so that the reflective groove reflects light, which passes through the optical panel, in a side direction.

5. The light unit as claimed in claim 1, wherein the optical panel has a column shape having the top surface greater than a lower surface, and the top surface has one of a circle shape, an oval shape, and a polygon shape.

6. The light unit as claimed in claim 1, wherein the dispersion member comprises a light-transmitting material and comprises a surface formed in a lens pattern or an embossing pattern.

7. The light unit as claimed in claim 6, wherein the lens pattern or embossing pattern is formed at a side surface, a lower surface and a top surface of the dispersion member.

8. The light unit as claimed in claim 1, wherein the optical panel comprises at least one of polymethylmethacrylate (PMMA), poly methyl meth acrylate styrene, poly carbonate, cycloolefine, and poly ethylene terephthalate.

9. The light unit as claimed in claim 1, wherein the light source module comprises a plurality of light source modules.

10. The light unit as claimed in claim 1, wherein the light source module, the bottom cover, and the dispersion member are integrally fixed to each other.

11. The light unit as claimed in claim 1, wherein the light emitting diodes comprise at least one of a light emitting diode using at least one of light emitting diode chip generating a visible light, and a light emitting diode using at least one light emitting diode chip generating a visible light and a phosphor.

12. The light unit as claimed in claim 1, wherein an upper portion of the light emitting diodes is protruded from the top surface of the bottom cover and the substrate is disposed under the bottom cover.

13. The light unit as claimed in claim 1, comprising a heat dissipation unit selected from the group consisting of a flexible graphite sheet, a heatsink, a radiant fin, and a peltier element, wherein the heat dissipation unit is on a rear surface of at least one of the bottom cover and the substrate of the light source module.

14. The light unit as claimed in claim 1, wherein the light emitting diodes are densely provided in at least one form of an N×M matrix, a circular configuration, or a polygonal configuration.

15. The light unit as claimed in claim 1, wherein a surface of the dispersion member includes a plurality of concave lenses.

16. A display apparatus comprising:
    a bottom cover including a first insertion hole which is formed at a center portion thereof;
    a light source module comprising a substrate and a plurality of light emitting diodes on the substrate, wherein the plurality of light emitting diodes are inserted into the first insertion hole of the bottom cover;
    a reflector member which includes a second insertion hole corresponding to the first insertion hole of the bottom cover and disposed at a top surface of the bottom cover;

a dispersion member disposed on the light emitting diodes and a central portion of the reflector member, and dispersing light generated from the light emitting diodes of the light source module, the dispersion member comprising an optical panel comprising a light-transmitting material on the light emitting diodes;

a double sided reflective sheet formed at a top surface of the optical panel;

an optical plate over the bottom cover; and a display panel on the optical plate.

17. The display apparatus as claimed in claim 16, wherein the dispersion member comprises:

a reflective groove slanted on a center portion of a top surface of the optical panel.

* * * * *